United States Patent
Evensen

(10) Patent No.: US 7,254,127 B2
(45) Date of Patent: Aug. 7, 2007

(54) METHOD FOR CHECKING WHETHER A MOBILE STATION SUPPORTS A LOCATION SERVICE (LCS) IN A PACKET SWITCHED MODE

(75) Inventor: Thommy Evensen, Froland (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 652 days.

(21) Appl. No.: 10/491,870

(22) PCT Filed: Oct. 18, 2002

(86) PCT No.: PCT/NO02/00377

§ 371 (c)(1),
(2), (4) Date: Apr. 7, 2004

(87) PCT Pub. No.: WO03/034770

PCT Pub. Date: Apr. 24, 2003

(65) Prior Publication Data

US 2004/0246918 A1    Dec. 9, 2004

(30) Foreign Application Priority Data

Oct. 19, 2001   (NO) .................................. 20015133

(51) Int. Cl.
*H04L 12/66* (2006.01)

(52) U.S. Cl. .................................. 370/352; 455/456.1

(58) Field of Classification Search ................ 370/352, 370/353, 354, 355; 455/456.1, 456.3, 445, 455/426.1
See application file for complete search history.

(56) References Cited

U.S. PATENT DOCUMENTS 7,116,984 B1 * 10/2006 Muhonen et al. ......... 455/456.1
2004/0058692 A1 * 3/2004 Kall et al. ............... 455/456.1

* cited by examiner

*Primary Examiner*—Lee Nguyen

(57) ABSTRACT

The present invention is related to LoCation Services (LCS) in General Packet Radio Service (GPRS). Because the specification of LCS was missing in the first versions of the technical specifications of GPRS, but already introduced in the GSM specifications, there will be a number of MSs having LCS capabilities when attached to circuit switched serving nodes (MSCs) but not when attached to packet switched serving nodes (SGSNs). When a location request for one such MS attached to both an MSC and an SGSN is directed to the SGSN first, an error may occur. The present invention discloses a method solving this problem by informing the associated HLR if the MS supports location service in packet switched mode or not at the time the MS attaches the network. The information is stored in the HLR, and when the location service node in the network receives a location request for that MS, the location node invokes the HLR for the information. If the MS does not support location service in packet switched mode, the HLR informs the location service node to firstly request the MS attached MSC for the location of the MS.

21 Claims, 3 Drawing Sheets

METHOD FOR CHECKING WHETHER A MOBILE STATION SUPPORTS A LOCATION SERVICE (LCS) IN A PACKET SWITCHED MODE

FIELD OF THE INVENTION

The present invention is related to LoCation Services (LCS) in General Packet Radio Service (GPRS). Terminology and abbreviations within the technical field of GPRS, well known for persons skilled in the art, will be used in this application, and reference is made to the 3GPP TS 23.271 specification for a detailed description of LCS.

BACKGROUND OF THE INVENTION

Higher data speed in cellular phone systems allows offering of new types of services. One of the service types that is expected to have a breakthrough with the launch of GPRS is the Localization Services. These are services providing mobile telephone users with information about where objects or persons are localized. This information may be presented on the user terminal on e.g. a digital map, or simply through statement of position, address or place name.

Further, Location Services may be considered as a network provided enabling technology consisting of standardised service capabilities, which enable the provision of location applications. The main component in LCS is the GMLC (Gateway Mobile Location Centre), to which all location requests are transmitted, providing the requested location from the mobile network. The application(s) may be service provider specific, for example tracking of persons or vehicles. However, the description of the numerous and varied possible location applications that are enabled by this technology are outside the scope of the present document.

As mentioned above, LSC will probably not become common in the GSM environment before the launch of GPRS. However, LSC was specified for GSM already in GSM 03.71, Release 4, but not in originally for GPRS. LSC was introduced in GPRS as late as in the 3GPP TS 23.271 released in 2001.

As a result of this, a large number of GPRS/GSM MSs will support LSC for GSM, but not for GPRS. This applies for MSs that have already been manufactured and for those being manufactured in the near future. Consequently, there will exist a large number of MSs with inconsequent LCS capabilities in many years ahead.

The problem then occurs when an LCS Client (another MS, a service node etc.) wants to track the position of a Mobile Station (MS) via GPRS, i.e. via an SGSN node, and that MS does not support LCS Capability for GPRS.

Due to that LCS for GPRS is standardised in a later release of the standard than LCS for GSM and even later than GPRS itself, it is entirely possible (even likely) to have MSs that support both LCS for GSM and GPRS, but does not support LCS for GPRS.

In this case, if the request for positioning is initially sent to the SGSN node, the positioning may fail in SGSN if the MS does not support LCS for GPRS, whereas if the request had been sent to MSC node (circuit switched GSM), it would have been successful.

The only known solution today is that the SGSN returns an error message, and that the GMLC due to this retransmits the location request towards the MSC.

The problem with the solution as described above is that the fetching of the positioning might be time critical, meaning that the response will be returned to the LCS Client too late if we first have to try against SGSN and then perform a second try against MSC.

SUMMARY OF THE INVENTION

The main object of the present invention is to overcome the above-identified problems. The present invention discloses a method and apparatus for providing location service to a mobile station within a cellular network wherein said mobile station is able to operate in both a packet switched and a circuit switched mode, and wherein said mobile station is attached to a first serving node within said cellular network when operating in the packet switched mode and attached to a second serving node within said cellular network when operating in the circuit switched mode, wherein the present invention, in response to said mobile station attaching to the first service node, determining whether said mobile station supports the location service in packet switched mode and storing said determination in said cellular network. Further in accordance with the present invention, in response to receiving a location request for said mobile station from a location node wherein said mobile station is currently being served by a particular service node within said cellular network, determining the address of the serving node and further determining whether the mobile station supports the location service in packet switched mode. In response to a determination that the mobile station does not support the location service in packet switched mode, the present invention further informing said location node that the location request should be directed to said second serving node.

DETAILED DESCRIPTION

The present invention discloses a method to inform the Home Location Register (HLR) in a GPRS/GSM network about the LCS Capabilities of the attached MS. When Gateway Mobile Location Centre (GMLC) then invokes the HLR for routing information (i.e. SGSN and/or MSC address), the HLR will based on the information from SGSN be able to tell GMLC whether it should try SGSN or MSC first, and by that having a larger likelihood to succeed with the positioning attempt of the subscriber.

The attached figures show the interactions between the different nodes involved in the Location Request.

According to the present invention, when an MS performs a GPRS Attach towards SGSN, it will inform the SGSN about the LCS capabilities it supports for GPRS network. When the MS roams into another SGSN, the LCS Capability information will also be informed to the new SGSN.

During the Attach or Inter SGSN Routing Area Update procedures the SGSN will update HLR about the MS's new location. According to the present invention, the SGSN shall then in addition include the LCS Capability information for this MS in the signalling procedure against HLR.

The HLR will now be informed about the LCS Capabilities for this subscriber, and can then use this information later on when a positioning is to be performed for this subscriber.

Consider that an LCS Client now wants to provide the position of this subscriber:

1) The LCS Client sends the Location Request towards the GMLC.
2) GMLC interrogates HLR for retrieval of routing information. The HLR will return routing information for SGSN or MSC or both, depending on where the subscriber is attached (GPRS Attached or IMSI Attached or both). As the HLR today only knows that the subscriber has attached to an SGSN and/or MSC, there is no valid information to prioritise the possibilities for a successful positioning on either SGSN or MSC in the cases when the subscriber is attached to both domains. However, when the feature of the present invention is supported, the HLR will, based on the information concerning the MS's Capabilities for LCS, be able to inform the GMLC if it should try the SGSN or the MSC first. HLR should then, for the subscribers where SGSN have indicated that LCS for GPRS is not supported, still return both SGSN and MSC address, but indicate that the MSC is the preferred one.
3) GMLC will then send the Location Request to the MSC. MSC then starts the location procedure against the MS and preferably gets the position, which then is returned via GMLC back to the LCS Client.

Figure 1:
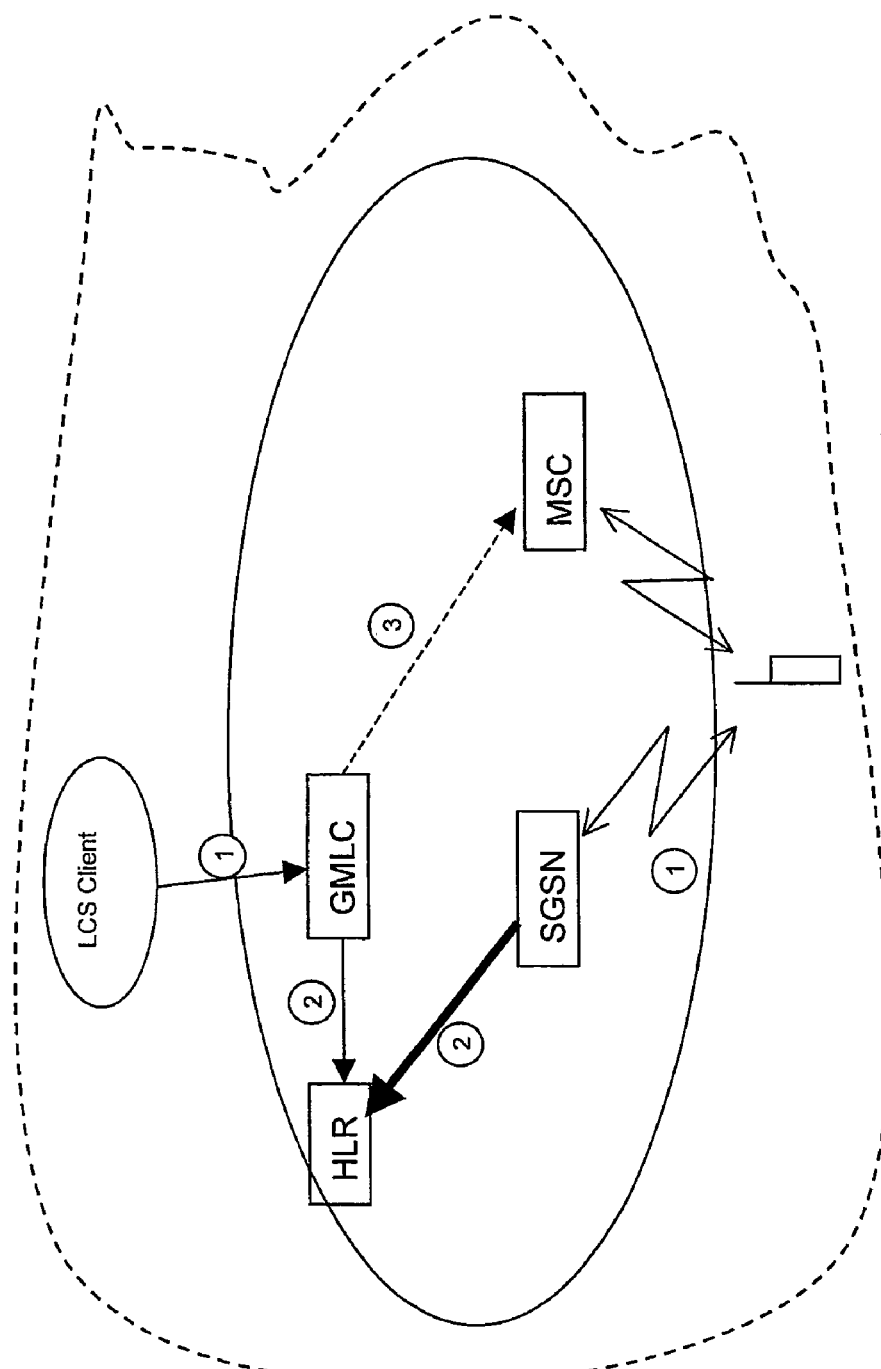
FIG. 1 is an overview of the nodes involved in a Location Request and the interaction them between, FIG. 2 shows an example of the message sequence of an attach procedure according to the 3GGP TS 23.060 specification.
Figure 2:
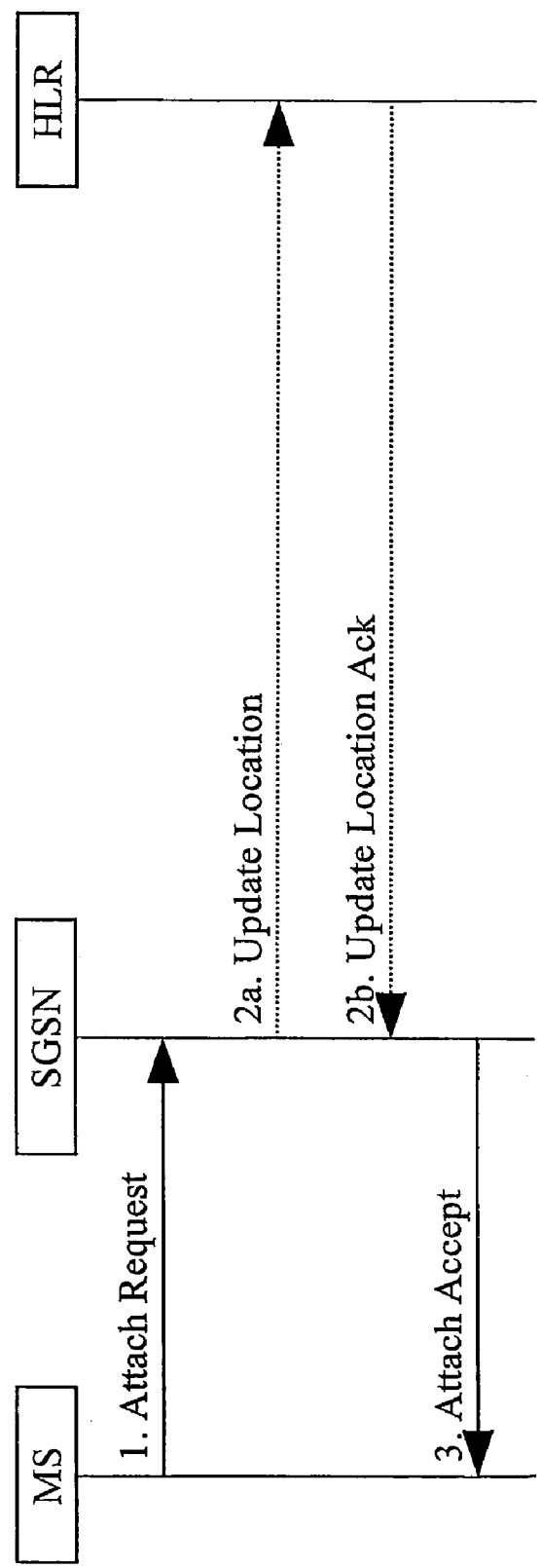

The sequence in FIG. 2 shows an example of the Attach procedure, as described in the 3GPP TS 23.060 specification. In the following, the sequence adjusted according to the present invention will be described.

1) For GPRS, the MS initiates the attach procedure by the transmission of an Attach Request message to the SGSN. The message contains among others the MS's GPRS LCS capabilities. In this example the MS does not support any LCS Capabilities for GPRS.
2) If the SGSN number has changed since the GPRS detach, or if it is the very first attach, then the SGSN informs the HLR:
   a) The SGSN sends an Update Location to the HLR. The information that the MS does not support LCS for GPRS is included.
   b) The HLR acknowledges the Update Location message by sending an Update Location Ack to the SGSN.
3) The SGSN sends an Attach Accept message to the MS.

Figure 3:
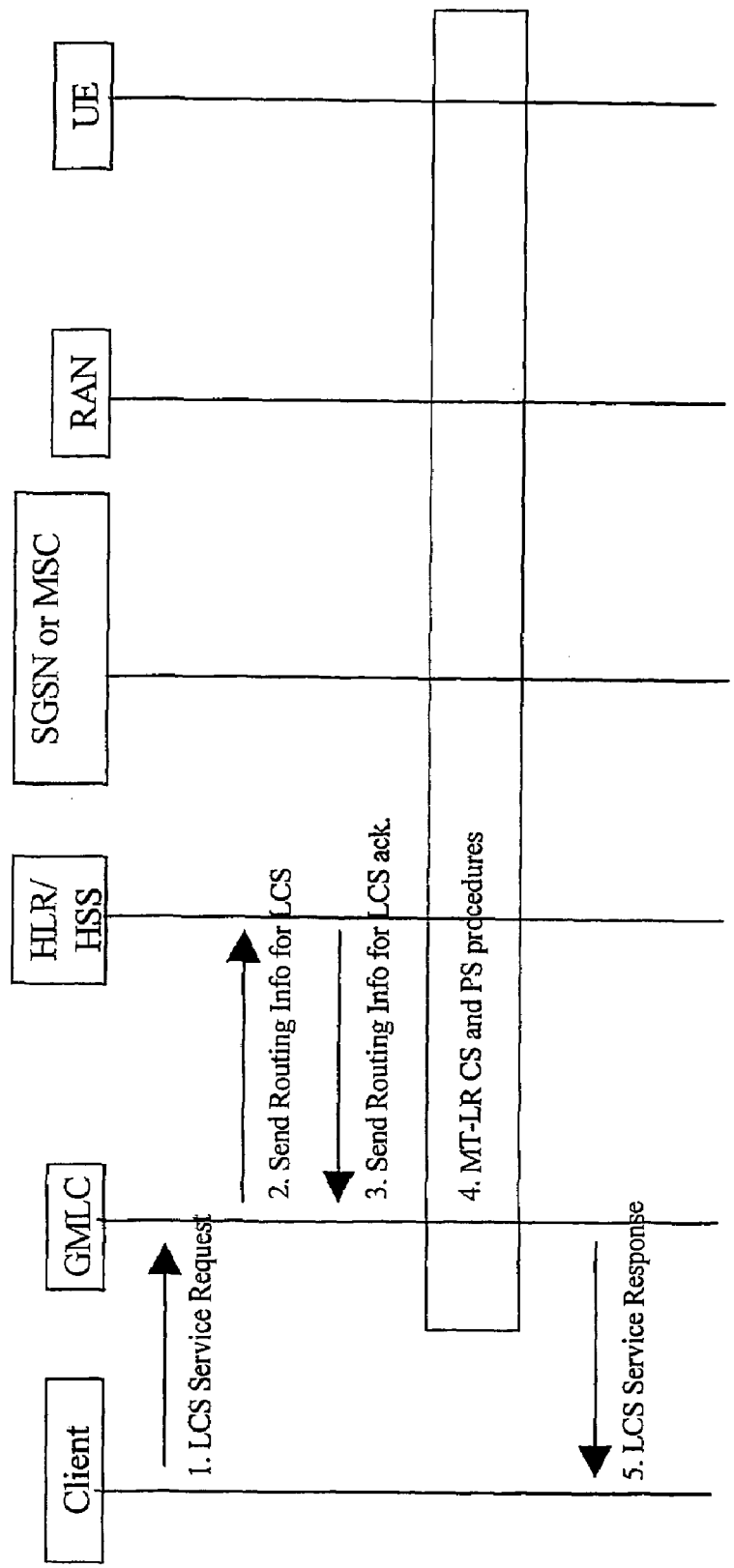
FIG. 3 shows an example of the message sequence of a mobile terminated location request according to the 3GGP TS 23.271 specification.

The sequence in FIG. 3 shows an example of a Mobile Terminated Location Request (MT-LR) procedure, as described in the 3GPP TS 23.271 specification. In the following, the procedure adjusted according to the present invention will be described.

1) An external LCS client requests the current location of a target UE from a GMLC.
2) GMLC sends a SEND_ROUTING_INFO_FOR_LCS message to the home HLR/HSS of the target UE to be located with the IMSI, PDP address or MSISDN of this UE as input parameters.
3) The HLR/HSS then returns one or several of the addresses, the current SGSN and/or MSC and whichever of the IMSI and MSISDN that was not provided in step (2) for the particular UE. Note that HLR may prioritise between the MSC or SGSN address sent to GMLC. This priority criterion is based on the present invention, and by that, HLR will in this example prioritise the MSC address.
4) In case GMLC receives only the MSC address, the MT LR proceeds as the CS-MT-LR procedure against MSC. In case GMLC receives only the SGSN address, the MT LR proceeds as the PS-MT-LR procedure against SGSN. In case the GMLC receives several of the following addresses, SGSN and/or MSC, it has to decide where to send the location request. According to the present invention, the decision will be based on the prioritisation made by HLR, and in this example GMLC will therefore request the MSC first.
5) When the location of the subscriber is returned from MSC the GMLC sends the location service response to the LCS client.

The main advantage with the present invention is that since the HLR will be able to make a proper prioritisation between the different possible routing information addresses for a location request, and not just randomly as today, the GMLC will be able to select the one having a larger likelihood for a successful location request. For time critical location requests, this might be the difference between an acceptable and an unacceptable response seen from the LCS Client point of view.

The present invention is also applicable to circuit switched core networks in GSM systems, and core networks.

The invention claimed is:

1. Method for a location service provided by a location node in a cellular network wherein Mobile Stations (MSs) are being able to operate in both a packet switched and a circuit switched mode, the MSs are attached to a first serving node for the packet switched mode, and to a second serving node for the circuit switched mode, the cellular network includes a register containing information concerning the location of the MSs, comprising the steps of:
   a) in the event one of the MSs attaches to the first serving node, informing the register whether the MS supports the location service in packet switched mode, or
   in the event one of the MSs attaches to the second serving node, informing the register whether the MS supports the location service in circuit switched mode; and
   b) when a location request for the MS is received at the location node, requesting the register for serving node address, and further determining whether the MS supports the location service in packet switched mode;
   in response to a determination that the MS does not support the location service in packet switched mode, informing the location node that the location request shall be directed to the second serving node.

2. Method according to claim 1,
   wherein that the cellular network is a GSM/GPRS network, the first serving node is an SGSN, the second serving node is an MSC and the register is an HLR.

3. Method according to claim 2,
   wherein that the location service is the location service defined in the 3GPP TS 23.271 specification, and the location node is a GMLC.

4. Method according to claim 2 wherein step b), the request to the register for the serving node address is a Send Routing Info for LCS message, and the information regarding that the location request shall be directed to the second serving node is included in a Send Routing Info for LCS acknowledge.

5. Method according to claim 1
   wherein that in step a), the information whether or not the MS supports the location service in packet switched mode is included in an Attached Request message transmitted from MS to the SGSN and in an Update Location message transmitted from the SGSN to the HLR.

6. A cellular network including a location node for providing a location service wherein Mobile Stations (MSs) are being able to operate in both a packet switched and a circuit switched mode, wherein the MSs are attached to a first serving node for the packet switched mode, and to a second serving node for the circuit switched mode, the cellular network includes a register containing information concerning the location of the MSs, comprising:
- a) in the event one of the MSs attaches to the first serving node, means for informing the register whether the MS supports the location service in packet switched mode, or
  in the event one of the MSs attaches to the second serving node, means for informing the register whether the MS supports the location service in circuit switched mode;
- b) when a location request for the MS is received at the location node, means for receiving a request for serving node address, and said means further determining whether the MS supports the location service in packet switched mode by evaluating information provided by said register; and
  in response to a determination that the MS does not support the location service in packet switched mode, means for informing the location node that the location request shall be directed to the second serving node.

7. The network according to claim 6, wherein that the cellular network is a GSM/GPRS network, the first serving node is an SGSN, the second serving node is an MSC and the register is an HLR.

8. The network according to claim 7, wherein that the location service is the location service defined in the 3GPP TS 23.271 specification, and the location node is a GMLC.

9. The network according to claim 6 wherein said information whether or not the MS supports the location service in packet switched mode is included in an Attached Request message transmitted from MS to the SGSN and in an Update Location message transmitted from the SGSN to the HLR.

10. The network according to claim 6 wherein said means for requesting to the register for the serving node address uses a Send Routing Info for LCS message, and the information regarding that the location request shall be directed to the second serving node is included in a Send Routing Info for LCS acknowledge.

11. A method for providing location service to a mobile station within a cellular network wherein said mobile station is able to operate in both a packet switched and a circuit switched mode, and wherein said mobile station is attached to a first serving node within said cellular network when operating in the packet switched mode and attached to a second serving node within said cellular network when operating in the circuit switched mode, comprising the steps of:
  In response to said mobile station attaching to the first service node, determining whether said mobile station supports the location service in packet switched mode and storing said determination in said cellular network;
  In response to receiving a location request for said mobile station from a location node wherein said mobile station is currently being served by a particular service node within said cellular network, determining the address of the serving node and further determining whether the mobile station supports the location service in packet switched mode;
  In response to a determination that the mobile station does not support the location service in packet switched mode, informing said location node that the location request should be directed to said second serving node.

12. The method of claim 11 further comprising the step of, in response to said mobile station attaching to the second service node, determining whether said mobile station supports the location service in circuit switched mode and storing said determination in said cellular network.

13. The method of claim 11 wherein said storing of said determination is performed by a home location register (HLR) associated with said mobile station.

14. The method of claim 11 wherein said first service node is an SGSN and said second serving node is an MSC.

15. The method of claim 14 wherein said step of determining whether said mobile station supports the location service in packet switched mode is performed by evaluating an Attached Request message transmitted from said mobile station to the SGSN and in an Update Location message transmitted from the SGSN to a home location register (HLR) associated with the mobile station.

16. The method of claim 14 wherein said location request for said mobile station is a Send Routing Info for LCS message and the information and said step of informing said location node that the location request should be directed to said second serving node includes a Send Routing Info for LCS acknowledge.

17. The method of claim 11 wherein said location service is the location service defined in the 3GPP TS 23.271 specification and said location node is a GMLC.

18. A system for providing location service to a mobile station within a cellular network wherein said mobile station is able to operate in both a packet switched and a circuit switched mode, and wherein said mobile station is attached to a first serving node within said cellular network when operating in the packet switched mode and attached to a second serving node within said cellular network when operating in the circuit switched mode, comprising:
  In response to said mobile station attaching to the first service node, means for determining whether said mobile station supports the location service in packet switched mode and storing said determination in said cellular network;
  In response to receiving a location request for said mobile station from a location node wherein said mobile station is currently being served by a particular service node within said cellular network, means for determining the address of the serving node and further determining whether the mobile station supports the location service in packet switched mode;
  In response to a determination that the mobile station does not support the location service in packet switched mode, mans for informing said location node that the location request should be directed to said second serving node.

19. The system of claim 18 further comprising, in response to said mobile station attaching to the second service node, means for determining whether said mobile station supports the location service in circuit switched mode and storing said determination in said cellular network.

20. The system of claim 18 wherein said means for storing of said determination includes a home location register (HLR) associated with said mobile station.

21. The system of claim 18 wherein said first service node is an SGSN and said second serving node is an MSC.

* * * * *

UNITED STATES PATENT AND TRADEMARK OFFICE
CERTIFICATE OF CORRECTION

| | |
|---|---|
| PATENT NO. | : 7,254,127 B2 |
| APPLICATION NO. | : 10/491870 |
| DATED | : August 7, 2007 |
| INVENTOR(S) | : Evensen |

It is certified that error appears in the above-identified patent and that said Letters Patent is hereby corrected as shown below:

In Column 2, Line 43, after "specification" delete "," and insert -- . --, therefor.

In Column 6, Line 52, in Claim 18, delete "mans" and insert -- means --, therefor.

Signed and Sealed this

Thirteenth Day of May, 2008

JON W. DUDAS
*Director of the United States Patent and Trademark Office*